US005709923A

United States Patent [19]

Ciaramitaro

[11] Patent Number: 5,709,923

[45] Date of Patent: Jan. 20, 1998

[54] PAIRED NUMERALS INCORPORATING COMPLEMENTARY DESIGNS

[75] Inventor: Fred Ciaramitaro, Eastpointe, Mich.

[73] Assignee: Stahls', Inc., St. Clair Shores, Mich.

[21] Appl. No.: 594,634

[22] Filed: Feb. 2, 1996

[51] Int. Cl.$^{6}$ .......... B32B 3/00

[52] U.S. Cl. .......... 428/195; 428/44; 428/88; 428/202; 428/212; 428/343; 428/488.4; 428/914

[58] Field of Search .......... 428/195, 411.1, 428/913, 914, 44, 88, 202, 212, 343, 488.4; 283/94

[56] References Cited

U.S. PATENT DOCUMENTS 5,098,772 3/1992 Strom .......... 428/211

*Primary Examiner*—William Krynski

*Attorney, Agent, or Firm*—Brooks & Kushman P.C.

[57] ABSTRACT

Paired numerals for use on sports clothing incorporate a common design theme throughout the numerals from 00 to 99 in which a left numeral set from 0 to 9 has each number of the set associated with a portion of the overall design theme and a right numeral set from 0 to 9 as each number of the set provided with the remaining portion of the design theme such that the portion of the design which appears in association with any number of the left numeral set compliments the design portion of any number in the right numeral set such that when any number from the left set is placed normally adjacnet and to the left of any number from the right set, the overall design theme will be completed.

12 Claims, 8 Drawing Sheets

PAIRED NUMERALS INCORPORATING COMPLEMENTARY DESIGNS

FIELD OF THE INVENTION

This invention relates to numerals which may be affixed to clothing or other surfaces for identification and/or decoration.

BACKGROUND OF THE INVENTION

Paired numerals are widely used to identify players in a variety of sports activities. The pairs comprise numerals from 00 to 99. They are generally applied to the jersey of the player and possibly to other items of clothing as well. The numerals are applied in several ways such as pre-cut and embroider stitched to the garment, pre-cut with a heat sealable adhesive backing and then heat sealed to the garment, screen printed onto the garment or a combination of such methods. The numerals may be made of merely ink layers, as in the case of screen printing, or of fabric, or plastic or combinations thereof. By whatever material they are made or by whatever method they are attached to the garment, the numerals are generally colored to contrast with the color of the uniform worn by the player so the player may be readily identified by the spectators and media reporters. The numerals normally occupy a relatively large area of the jersey, and are placed on the back thereof. The front of the jersey generally carries graphics and or letters identifying the team to which the player belongs.

As far as I am aware, paired numerals have never incorporated an overall design theme which would both add to the identification of the team and the artistic attractiveness of the numerals and in turn the uniform on which they appear. Many sports teams have nicknames or trademarks such as the Sharks, the Bulls, the Tigers, the Indians, etc. High school and college teams and most organized sports teams have some identifying logo. While these logos or designs appear on the uniform they are separate from the numerals identifying the players.

SUMMARY OF THE INVENTION

According to my invention the paired numerals appearing on sports jerseys or other pieces of clothing for any given team incorporate a design theme which may be based on the team trademark or motif. The theme is incorporated in such a way as not to interfere with the player identification function of the numerals yet artistically enhance the numeral pair, rendering the garment more attractive.

In carrying out my invention the numeral pairs comprise a left numeral set from 0–9 in which each number of the set has a portion of the overall design theme associated with it. A right numeral set from 0–9 has each number of the set provided with the remaining portion of the design theme. The portion of the design which appears in any number of the left numeral set complements the design portion of any number in the right set such that when any number from the left set is placed normally adjacent and to the left of any number from the right set, the overall design theme will be completed.

In some instances the design theme may involve removal of a portion, or interruption of the periphery, of the numbers of one or both sets. The design theme may simply be a patterned design of one or more colors contrasting with the colors of the numerals. As may be appreciated from a review of this disclosure, the design themes that may be associated with the numeral sets is virtually unlimited, though whatever the design may be, it should not unduly interfere with a ready comprehension of the numeral pair with which it is associated. It is also to be appreciated that while in some instances, depending on the design, the same left and right number may be identical, in many or most instances the same left and right numbers will differ to a greater or lesser extent.

BRIEF DESCRIPTION OF PREFERRED EMBODIMENT

Figure 1:
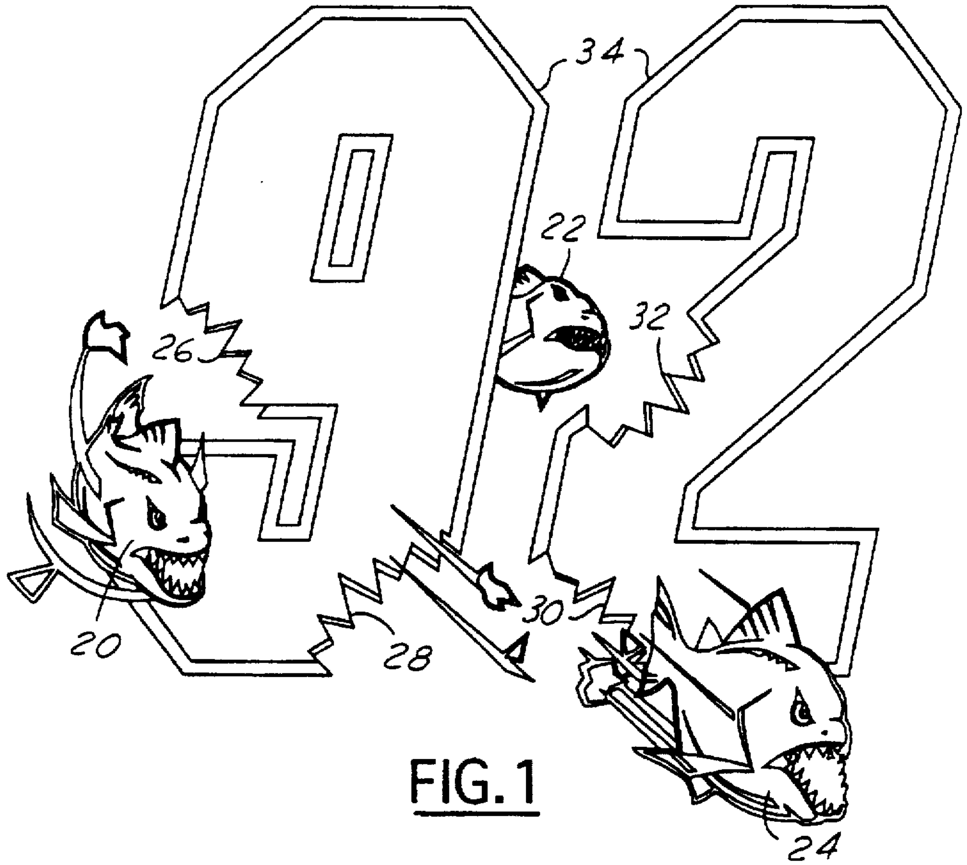
FIG. 1 shows a paired numeral 92 with a shark or piranha design theme in which the number 9 is taken from a left hand number set and the number 2 is taken from a right hand number set and in which the design component of each number in the left set complements the design component of each number of the right set such that when any number from the left set is placed adjacent and to the left of any number from the right set not only is the numeral readily identifiable but the overall design theme is complete.

While I refer to numerals and numbers and so describe them herein, it is to be understood that such are embodied in signs to appear on sign boards, boats, automotive vehicles or the like, or numbers to be applied to sports jerseys other items of clothing, fabrics and the like. The numbers may be made of any suitable material for the application intended and may be applied in any convenient fashion, such as by the use of adhesives, sewing, screen printing, heat sealing and the like. The principle use for these numeral pairs is where numerals from 00 to 99 or some numeral run therein is to be displayed and a design theme is to be incorporated therein or associated with the numerals so that whatever numeral pair is desired, the overall design theme will be depicted.

In order to carry out the invention, numeral pairs are made up using left and right number sets, each from 0–9. Each number of the left number set has a portion of the design theme associated with it. Each number of the right number set has the remaining portion of the design theme associated with it. The design portion of each number of the left number set has been so configured and arranged in relation to its number, and the design portion of each number of the right number set has been so configured and arranged in relation to its number, that the design portions of any number from the left number set will complement the design portion of any number of the right number set. As a result, when any number of the left number set is placed in a normal position adjacent and to the left of any number from the right number set, to exhibit a numeral pair, the overall design theme will be completed. Thus, for example, a sports uniform shop may fill an order for a sports team jerseys in which a design theme is to be carried out in association with the numerals, without having to have each pair of numerals custom designed; any combination of numbers from the left and right sets when placed in normal reading position will depict the overall design theme.

In the drawings I have shown merely representative examples of paired numerals and selected component numbers taken from left and right hand (referred to herein simply as left or right) number sets. It is to be understood that the left and right number sets from 0–9 will be completed so that the design portions of each number from one set will complement the design portion of each number of the other set when the numbers are placed in the normal reading position.

Figure 2:
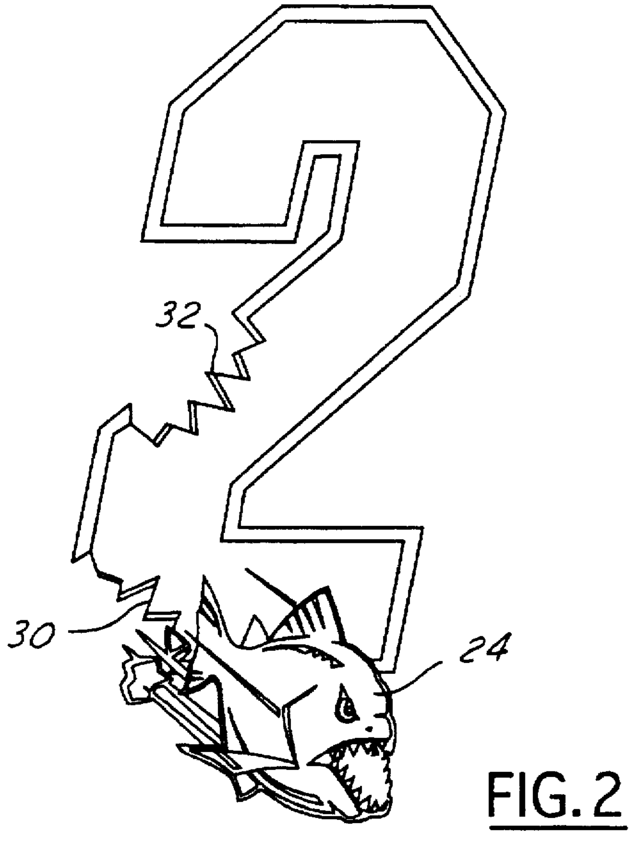
FIG. 2 shows the number 2 from the right hand number set used in the depiction of FIG. 1.
Figure 3:
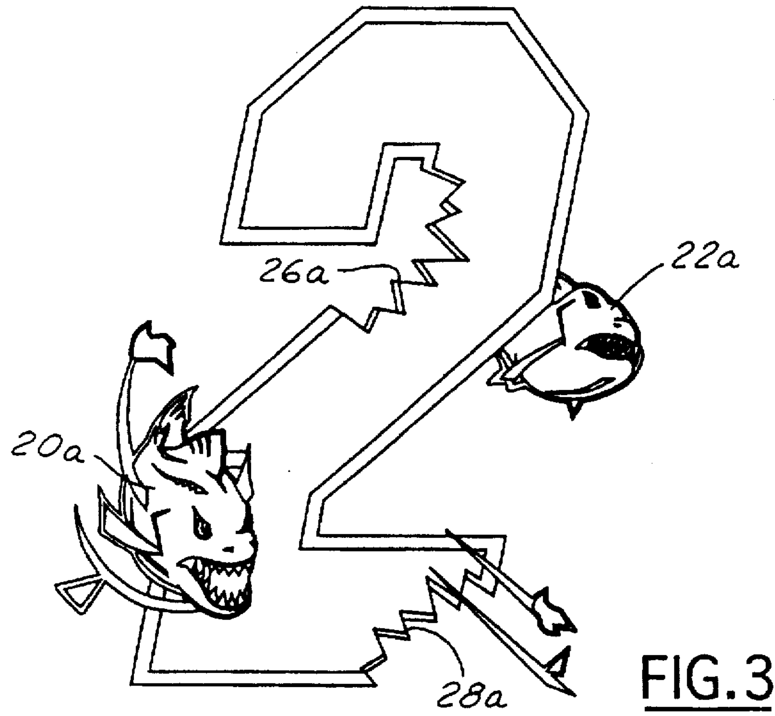
FIG. 3 shows the number 2 from the left hand number set from which set the number 9 of FIG. 1 was taken and having the lefthand portion of the shark design theme which complements the righthand portion of the shark design theme.
Figure 4:
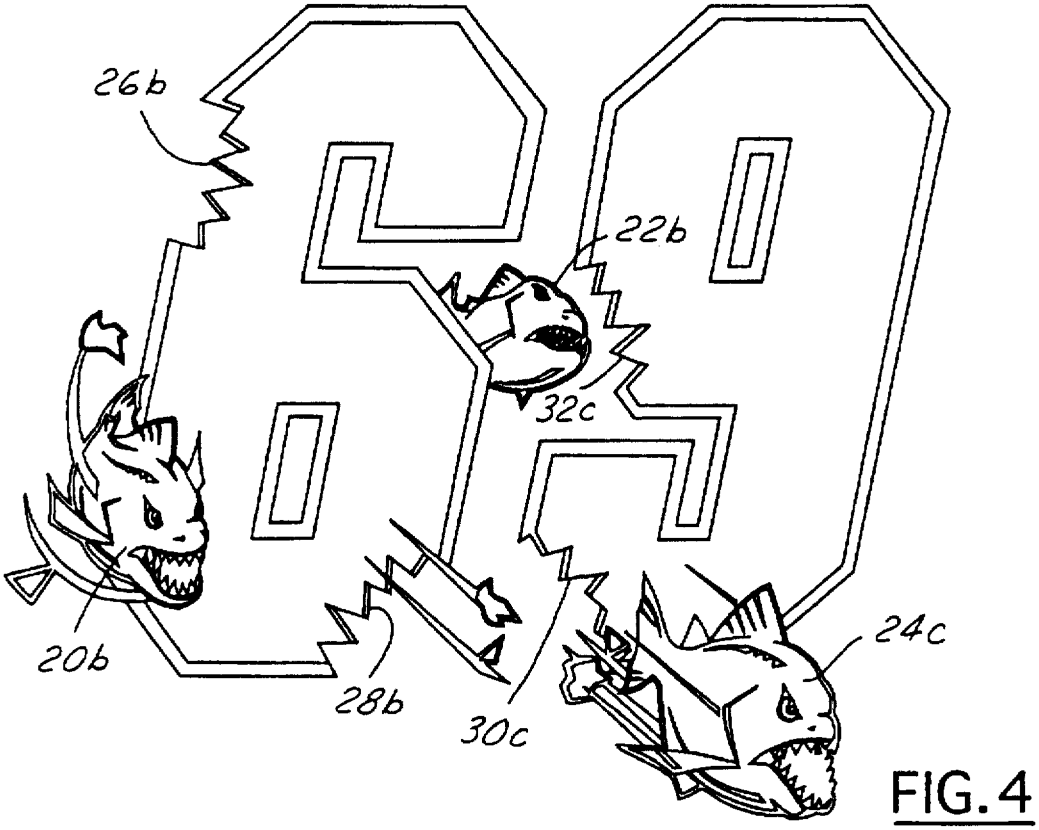
FIG. 4 shows the paired numeral 69 having complemental portions of the shark design theme of the previous Figs and wherein the number 6 is taken from the left number set and the number 9 is taken from the right number set.
Figure 5:
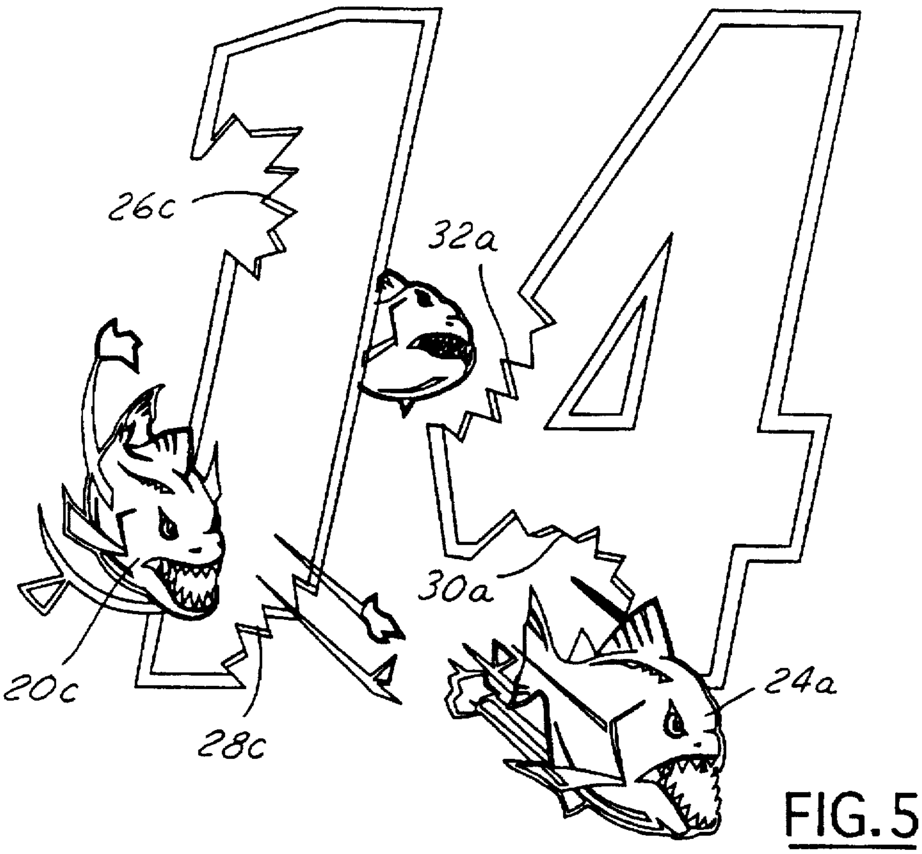
FIG. 5 shows the paired numeral 14 having the shark design theme of the previous Figures in which there is a number 1 taken from the left hand number set and a number 4 taken from the right hand number set.
Figure 6:
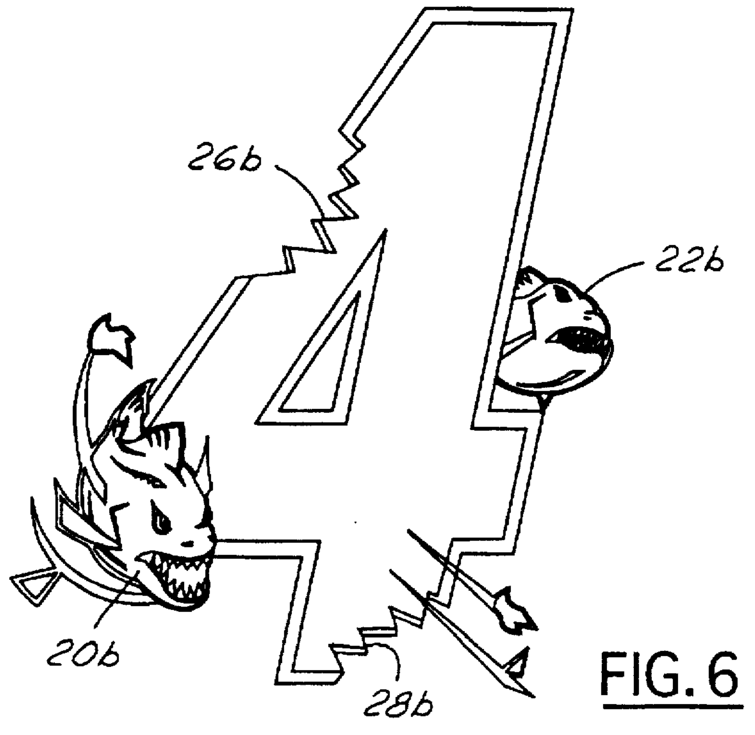
FIG. 6 shows the number 4 taken from the left hand set, as opposed to the number 4 of FIG. 5 which was taken from the right hand set.
Figure 7:
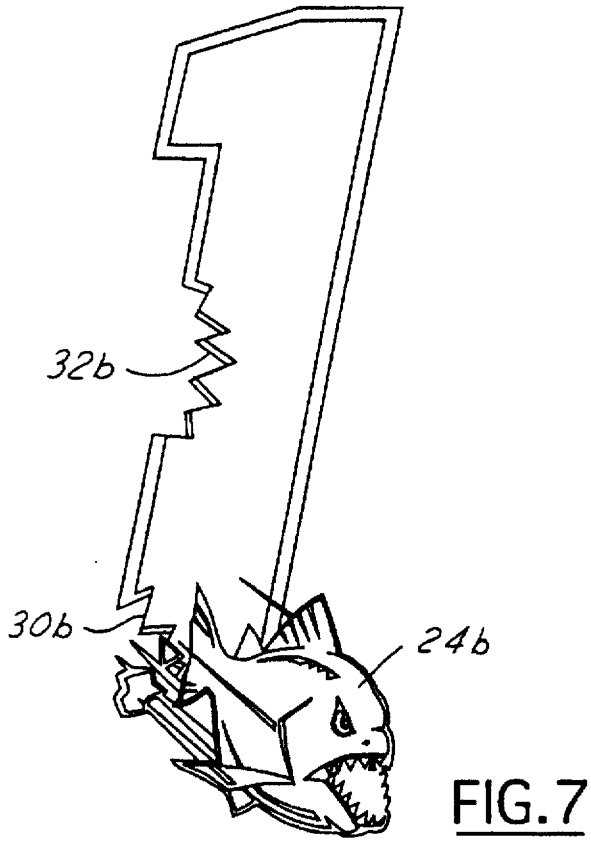
FIG. 7 shows the number 1 taken from the right hand number set, as opposed to the left hand set from which the number 1 of FIG. 5 was taken and showing the difference between the numbers and their respective design portions taken from left and right number sets.
Figure 8:
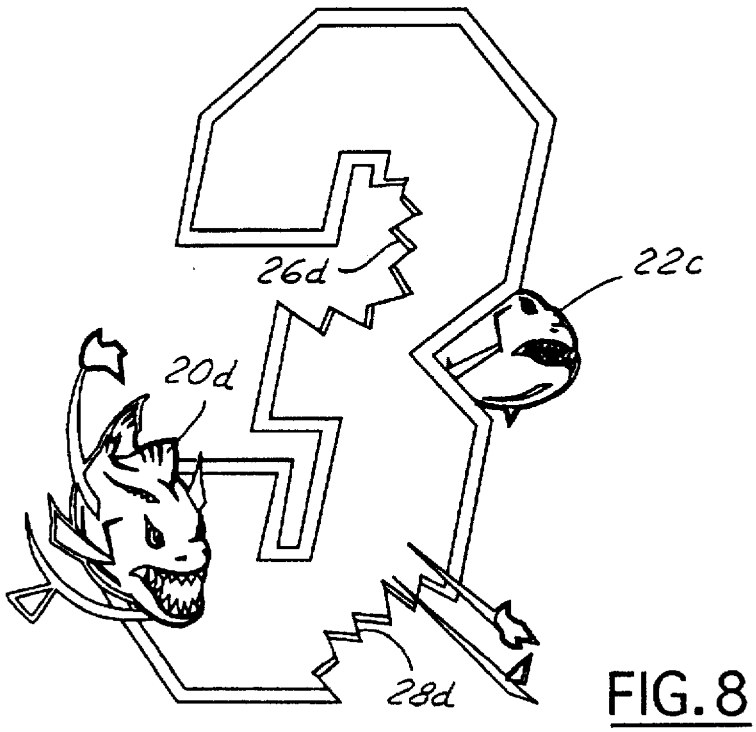
FIGS. 8 and 9 show the numbers 3 taken respectively from the left and right number sets and once again show the differences between the same number taken from the right and left number sets.
Figure 9:
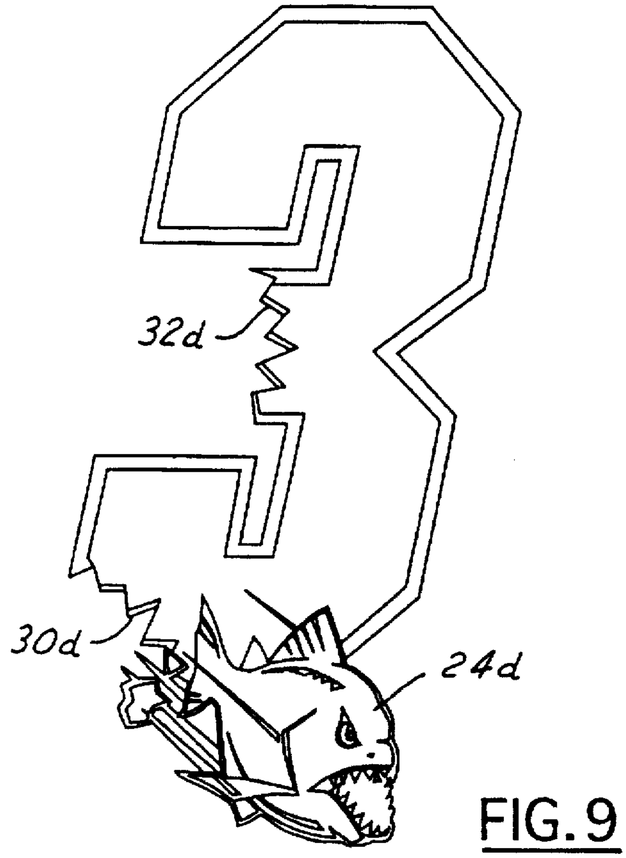

Referring to FIG. 1, I have shown the paired nummeral 92 with a shark or piranha design theme of three sharks/piranha 20, 22 and 24 aggressively swimming through and taking bites 26, 28, 30 and 32 from the numerals. The number 9 is taken from what I have termed a left number set, while the number 2 is taken from a right number set. Each set will run from 0–9. Each number of each set will be designed with a portion of the shark scene depicted, as for example in FIGS. 2 and 3 where the number 2 is shown respectively from the right and left sets and have respectively the sharks 24 and 20*a* and 22*a*. The alpha suffixes used herein identify similar design portions. The number 2 from FIGS. 2 and 3 may be paired similar to the paring of FIG. 1. It will be noted that the right number 2 in FIG. 2 and the left number 2 in FIG. 3 have the sharks arranged slightly differently around them and the sharks bites 26*a* and 28*a* from FIG. 3 are in different locations than the bites 30 and 32 of FIG. 2. However, it will also be noted that the two sharks 20*a* and 22*a* in FIG. 3 are located in relation to the number 2 (which is in the left number set) in substantially the same relation as the two sharks 20 and 22 in relation to the number 9 in FIG. 1. Such is true because the number 9 in FIG. 1 is taken from the left number set, and the portion of the design theme in all left set numbers will be similiar. The portion of the design theme for all the numbers in the right number set will be similar, and thus the arrangement of the shark 24 and the bites 30 and 32 out of number 2 in FIG. 2 is similar to the shark 24*a*and bites 30*a*and 32*a*out of the number 4 in FIG. 5. A comparison of other numbers taken from the right and left number sets will show the similarities of the numbers and design portions of the respective sets.

Figure 10:
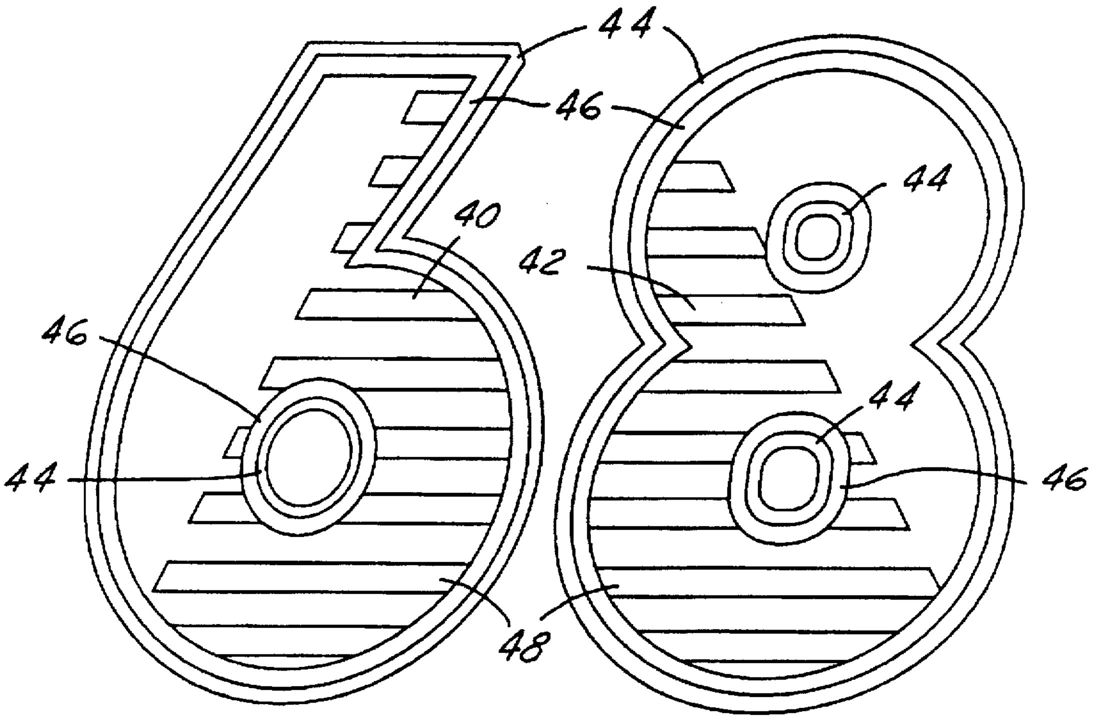
FIGS. 10, 11 and 12 show further examples of numeral pairs having a pyramid or triangular design theme associated with them and in which the left hand number is taken from a left hand number set of 0–9 and has a portion of the overall pyramid design theme associated therewith, and the right hand number is taken from a right hand number set from 0–9 and has the remainder of the pyramid design theme, such that when the numbers are associated in numeral pairs with the right hand number adjacent and to the right of any member of the left hand number set, the design theme portions will complement each other to complete the overall pyramid design theme.
Figure 11:
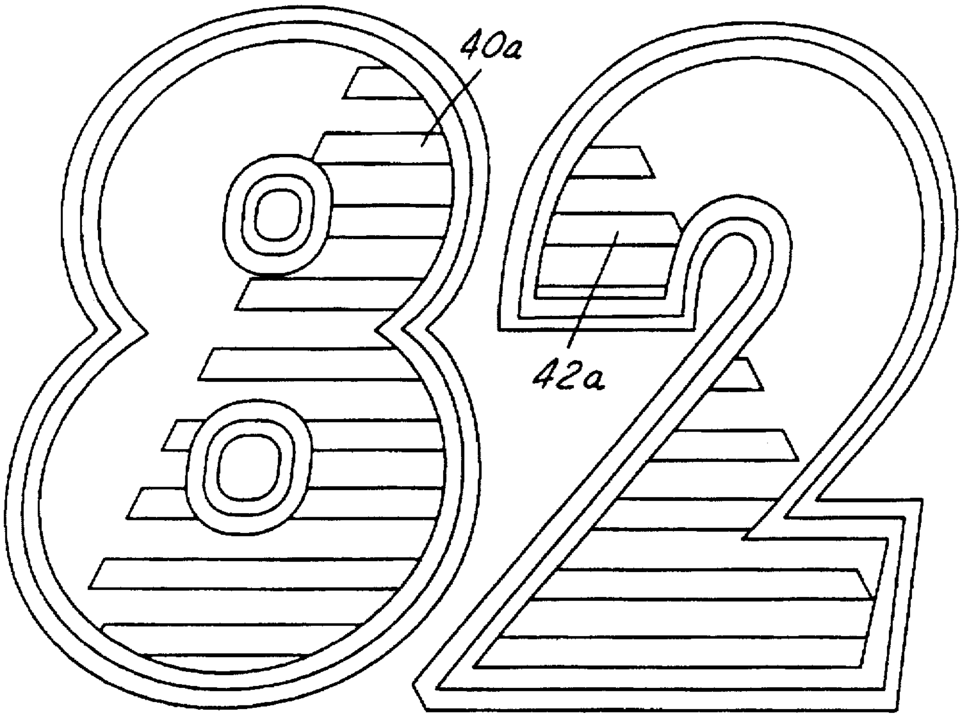
Figure 12:
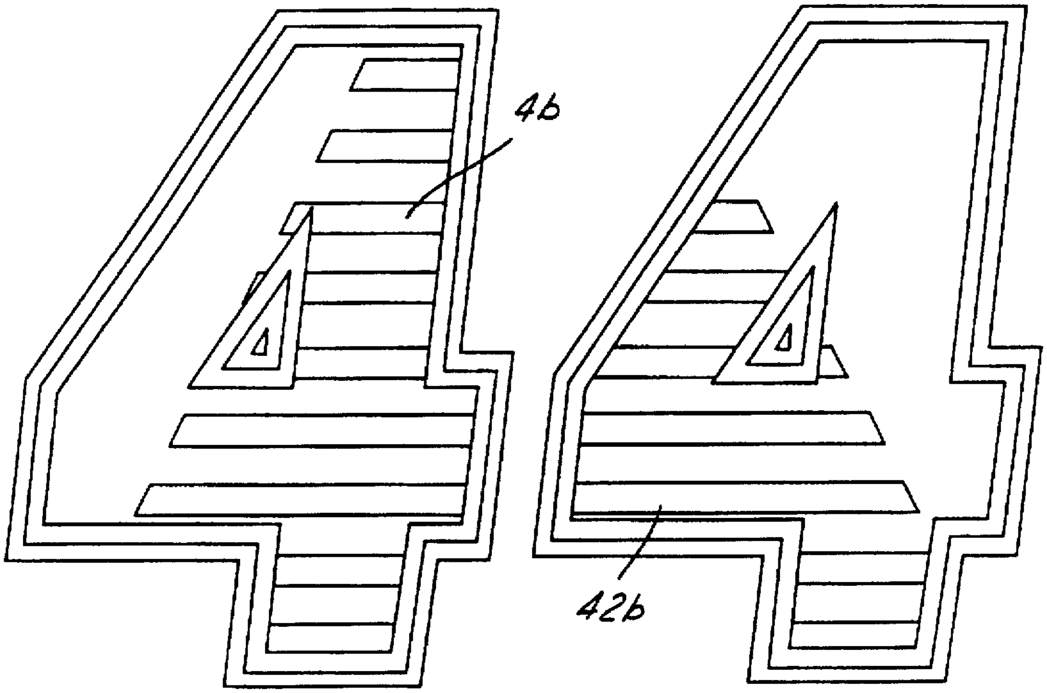
Figure 13:
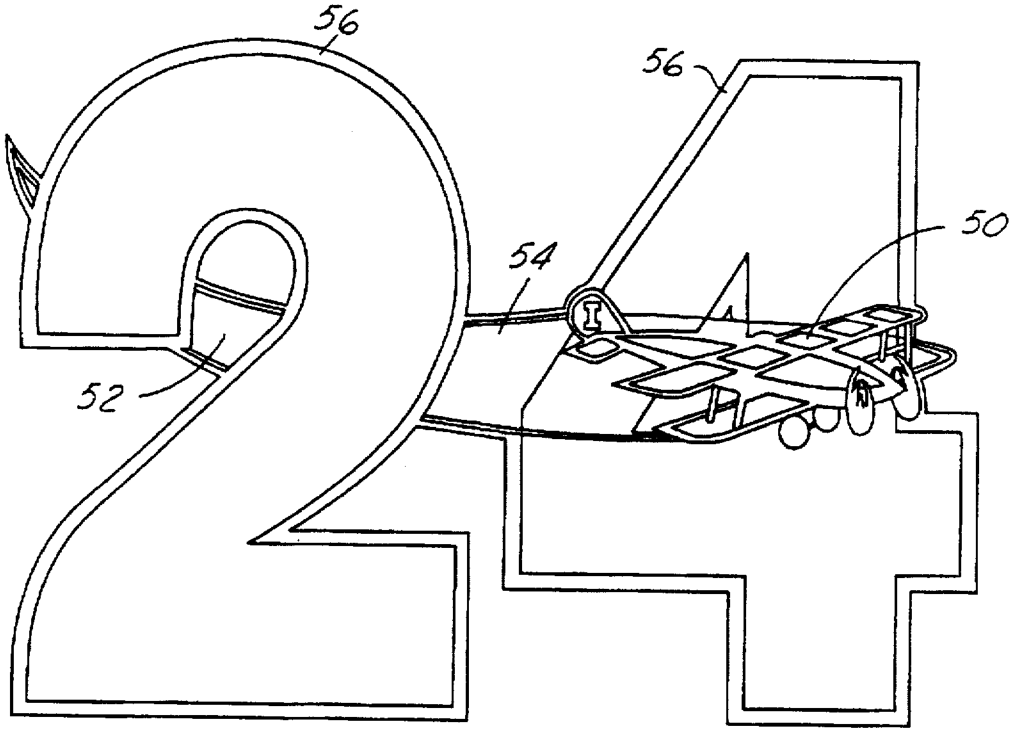
FIGS. 13–16 illustrate another example of my paired numerals in this case having a flying airplane design in which the left number in FIG. 13 is taken from a left hand number set of 0–9 and has a portion of the overall design and the right hand number in FIG. 13 is taken from a right hand number set of 0–9 and has the remainder of the flying airplane design, and the other Figures illustrate individual numbers taken from the right or left number sets as indicated thereon.
Figure 14:
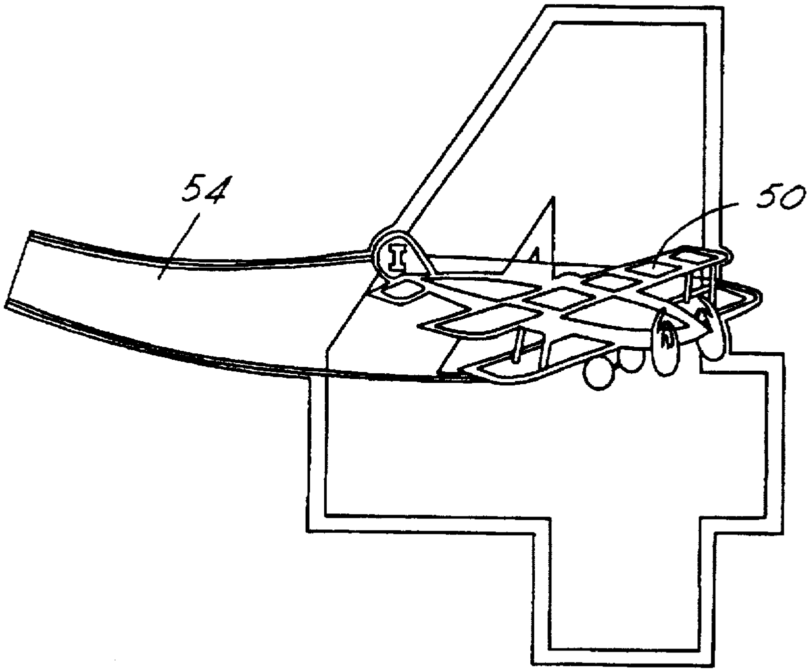
Figure 15:
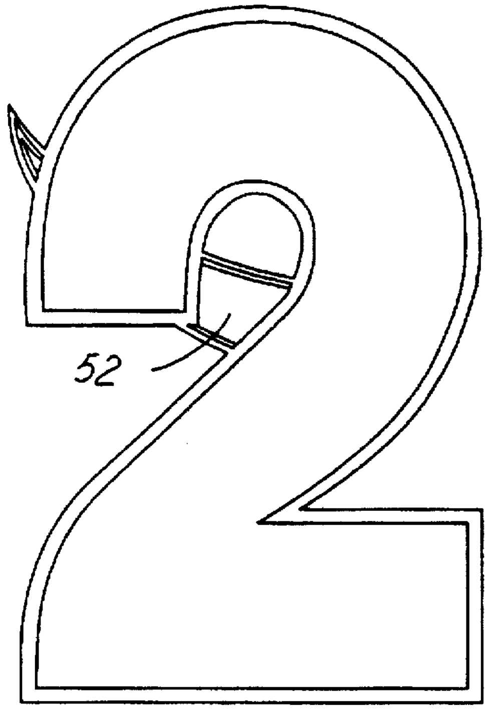
Figure 16:
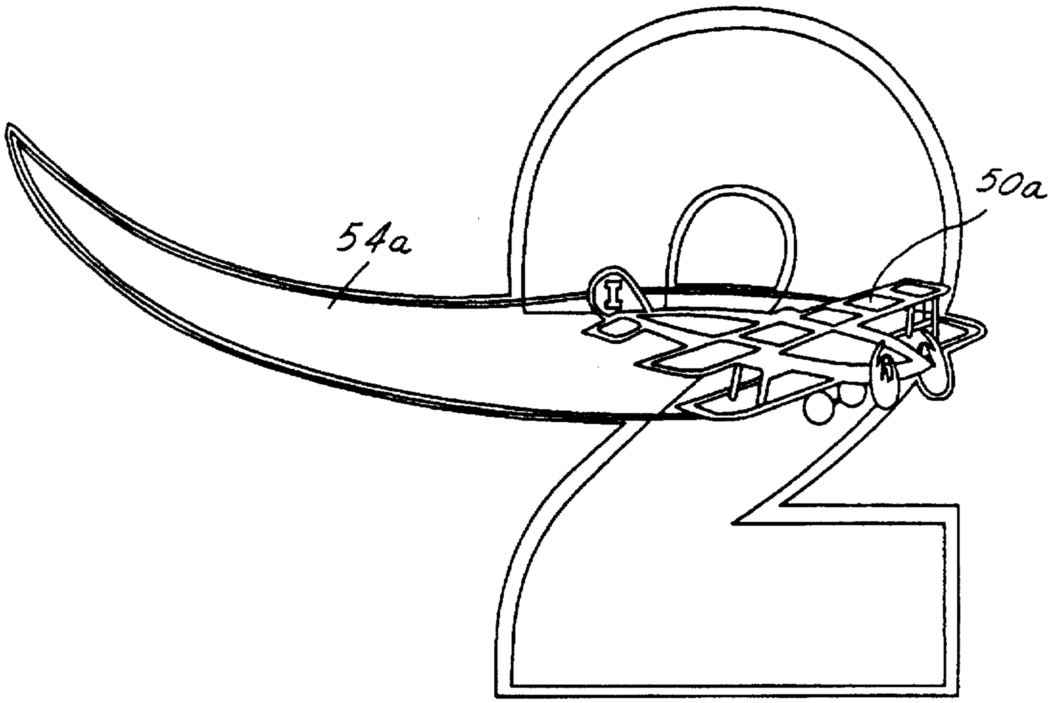

While the drawings do not depict colors, the numbers may be colored as may the design portions to carry out a color scheme that further ties the numbers and the design portions together and enhance the artistic impression. For example, in FIGS. 1–9 the perimeter of the numbers is black as at 34, while the remainder of the numbers may be bright red. The sharks may be green with white teeth and red tinged eyes to make them appear ferocious. In FIGS. 10–12 the numbers may be outlined in black as at 44. Just inside the black the letters may be white as at 46. The pyramid may be yellow as at 48. In FIGS. 13–16, the numbers may be bright red, the airplane yellow and black, the tail gray, and the periphery of the numbers may be defined by a white line 56.

In FIGS. 10–12 I have shown the invention embodied in numerals haveing a pyramid design theme which is wholly within the perimeter of the numbers. Again, the left hand numbers are taken from a left number set and depict a first part of the design theme, while the right hand numbers are taken from a right number set and depict the remaining portion 42 of the design theme. The number 6 of FIG. 10 can be substituted for the number 8 of FIG. 11 and the pyramid design theme will be completed and give the same impression in both cases.

FIGS. 13–16 depict further examples of the invention embodied in another design theme. Here an airplane 50 flies from left to right between the letters; the long tail 52 and 54 sweeping behind the number 2 in FIG. 13 and across the face of the number 4. Comparing the numbers 2 in FIGS. 13 and 15, which are taken from the left number set, and then again the number 4 in FIGS. 13 and 14, the complementary character of the design theme portions from the right and left number sets is readily noted.

In creating the number sets it is important not merely to have the design theme portions accurately arranged and configured so that those of the left number set complement those of the right number set, but also that the numbers be readily discernible.

In the drawings I have shown merely representative combinations of numbers and designs and those skilled in the art will not only readily complete the entire sets for those numbers and designs depicted, but conceive of a virtually unlimited variety of numerals and designs which may be combined in accordance with the teachings herein.

As used in the claims, the expression "numeral pairs" is intended to denote, numbers used in signs, or on boats or boating equipment such as sails, automotive vehicles or the like, numbers for clothing, such as sports clothing or other fabrics, blankets, such as horse blankets, caps, shoes, or any other surface or object to be identified or distinguished.

What is claimed is:

1. Numeral pair transfers, with each pair having a left transfer number and a right transfer number and a design theme associated therewith for decorating clothing, fabrics and the like comprising, in combination:

a left transfer having a number selected from a numeral set from 0–9, said left transfer having a portion of the design theme associated therewith;

a right transfer having a number selected from a numeral set from 0–9, said right transfer having the remaining portion of the design theme associated therewith; and said design theme portions and the numbers associated therewith being so configured and arranged that said left transfer with any number from the numeral set, when placed adjacent to the left of any said right transfer with any number from the right numeral set, in a position to exhibit a numeral pair, has its design theme portion complementing the design theme portion of said right transfer to complete the design theme.

2. The invention defined by claim 1 wherein the design theme is imposed directly on the numbers of at least one set.

3. The invention defined by claim 1 wherein the design theme is imposed directly on the numbers of both the left transfer and right transfer numeral sets.

4. The invention defined by claim 1 wherein each number in each numeral set has a peripheral edge and the design theme interrupts the peripheral edge of the numbers of at least one transfer numeral set.

5. The invention defined by claim 1 wherein each transfer number in each numeral set has a peripheral edge and the design theme interrupts the peripheral edge of the numbers of both transfers numeral sets.

6. The method of making numeral pairs transfers having a common design theme associated therewith for decorative clothing, fabrics, and the like, comprising:

making a left transfer having a number from a numeral set from 0–9, including applying a left portion of a common design theme on said transfer;

making a right transfer having a number from a numeral set from 0–9, including applying a right complementary portion of said common design theme in association with each letter of such set;

selecting left and right transfers to form any desired numeral pairs; and positioning them with the left transfer and right transfer common design portions of the design theme complementing each other to complete the design theme.

7. The invention defined by claim 6 wherein the portions of the design theme for the left and right numeral sets are imposed directly on the numbers of each set.

8. The invention of claim 6 wherein the design theme includes an interruption of the outline of the numbers of at least one transfer numeral set.

9. The invention of claim 6 wherein the design theme is imposed directly upon the numbers of each transfer numeral set and the outline of the numbers is interrupted in at least one set.

10. The invention of claim 6 wherein the numeral pair transfer are heat applied transfers.

11. The invention of claim 6 wherein the transfers have a pressure sensitive adhesive thereon for application to hard surfaces.

12. The invention of claim 6 wherein the numeral pair transfers are sewn to an underlying substrate.

* * * * *

UNITED STATES PATENT AND TRADEMARK OFFICE
CERTIFICATE OF CORRECTION

PATENT NO. : 5,709,923

DATED : January 20, 1998

INVENTOR(S) : FRED CIARAMITARO

It is certified that error appears in the above-identified patent and that said Letters Patent is hereby corrected as shown below:

Column 6, Line 21, after "one" insert --transfer numeral--.

Column 6, Line 23, delete "transfer" and insert --transfers--.

Signed and Sealed this

Twenty-ninth Day of September, 1998

*Attest:*

Bruce Lehman

BRUCE LEHMAN

*Attesting Officer*

*Commissioner of Patents and Trademarks*